United States Patent
Faruque et al.

(10) Patent No.: US 11,673,524 B1
(45) Date of Patent: Jun. 13, 2023

(54) SELECTIVELY INFLATED CROSSBAR AIRBAG

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/532,357

(22) Filed: Nov. 22, 2021

(51) Int. Cl.
| | | |
|---|---|---|
| *B60R 21/015* | (2006.01) | |
| *B60R 21/231* | (2011.01) | |
| *B60R 21/213* | (2011.01) | |
| *B60R 21/233* | (2006.01) | |
| *B60R 21/01* | (2006.01) | |
| *B60R 21/02* | (2006.01) | |

(52) U.S. Cl.
CPC ...... *B60R 21/213* (2013.01); *B60R 21/01512* (2014.10); *B60R 21/231* (2013.01); *B60R 21/233* (2013.01); *B60R 2021/01034* (2013.01); *B60R 2021/01211* (2013.01); *B60R 2021/01245* (2013.01); *B60R 2021/0246* (2013.01); *B60R 2021/0273* (2013.01); *B60R 2021/23107* (2013.01); *B60R 2021/23153* (2013.01); *B60R 2021/23161* (2013.01); *B60R 2021/23308* (2013.01); *B60R 2021/23324* (2013.01)

(58) Field of Classification Search
CPC . B60R 21/213; B60R 21/08; B60R 21/01512; B60R 21/015; B60R 21/231; B60R 21/233; B60R 2021/0246; B60R 2021/0273; B60R 2021/01211; B60R 2021/23107; B60R 2021/01245; B60R 2021/23161; B60R 2021/23153; B60R 2021/23308; B60R 2021/23324; B60R 2021/01034
USPC .... 280/753, 735, 728.1, 728.2, 730.1, 743.1
See application file for complete search history.

(56) References Cited

U.S. PATENT DOCUMENTS

| | | | |
|---|---|---|---|
| 5,655,817 A * | 8/1997 | Nienow | B60R 22/105 |
| | | | 297/487 |
| 9,994,182 B1 * | 6/2018 | Jaradi | B60R 21/214 |
| 10,807,556 B2 | 10/2020 | Hill et al. | |
| 10,906,496 B2 | 2/2021 | Baccouche et al. | |
| 11,273,785 B1 * | 3/2022 | Faruque | B60R 21/01554 |
| 11,358,554 B1 * | 6/2022 | Jaradi | B60R 21/231 |
| 2020/0377041 A1 * | 12/2020 | Sekizuka | B60R 13/0823 |
| 2021/0107426 A1 * | 4/2021 | Choi | B60N 3/002 |

FOREIGN PATENT DOCUMENTS

KR  1020210021713 A  3/2021

* cited by examiner

*Primary Examiner* — Keith J Frisby
(74) *Attorney, Agent, or Firm* — Frank A. MacKenzie; Bejin Bieneman PLC

(57) ABSTRACT

An assembly for a vehicle includes a first seat and a second seat. The assembly includes a crossbar positioned between the first seat and the second seat. The assembly includes an airbag supported by the crossbar. The assembly includes a controller programmed to position the crossbar in a raised position in response to a detected occupant egress.

16 Claims, 12 Drawing Sheets

SELECTIVELY INFLATED CROSSBAR AIRBAG

BACKGROUND

Vehicles are equipped with airbags. In the event of an impact, an inflator activates and provides inflation medium to the airbags, and the airbags pressurize and act as supplemental restraints for occupants during the impact. The airbags are located at various fixed positions in passenger compartments of vehicles. Vehicles may include airbags supported on a dash, side air curtains mounted to the roof rails, side airbags mounted to seats, etc.

DETAILED DESCRIPTION

Figure 1:
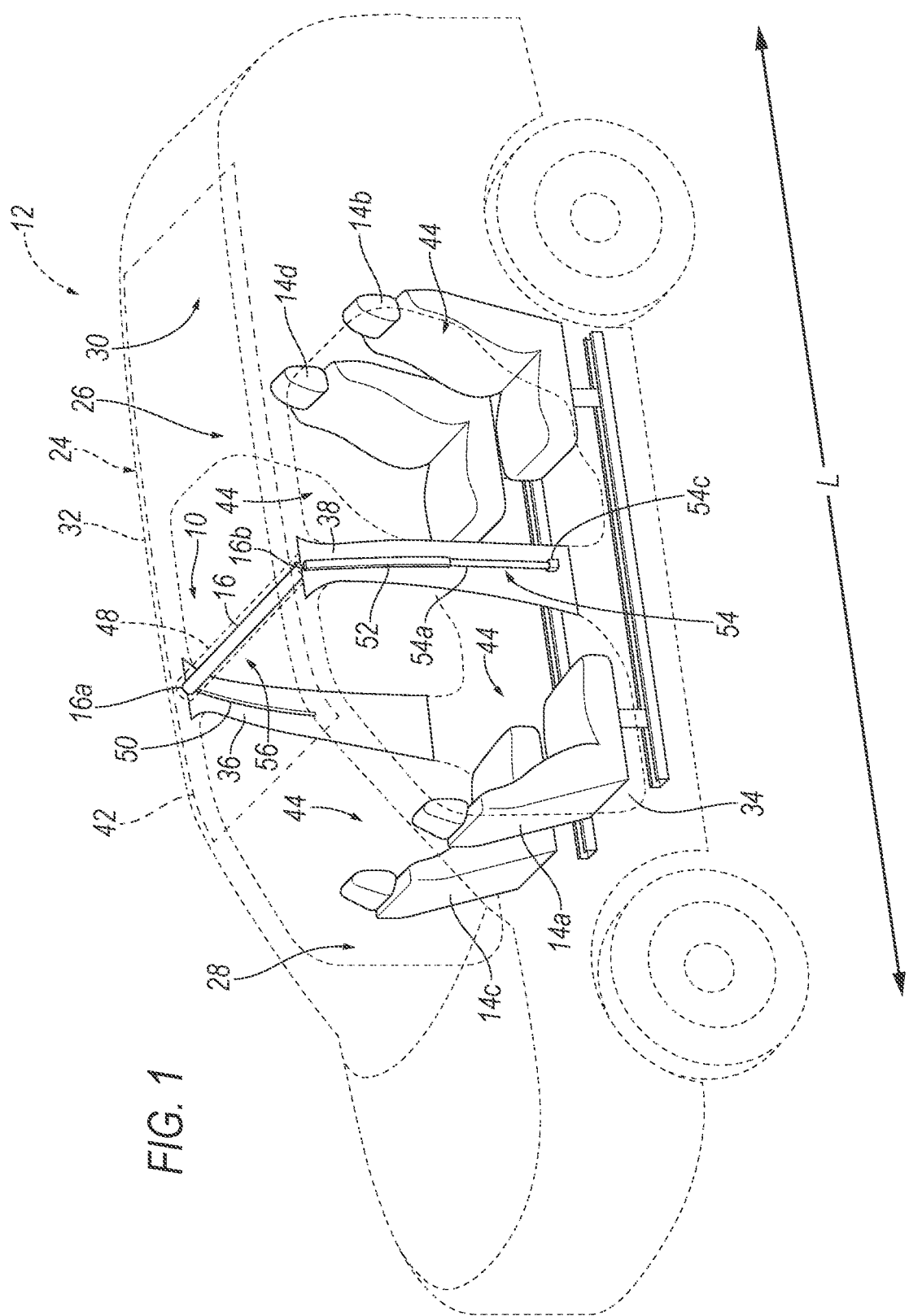
FIG. 1 is a perspective view of a vehicle with a plurality of seats and a crossbar in the raised position.

An assembly for a vehicle includes a first seat and a second seat. The assembly includes a crossbar positioned between the first seat and the second seat. The assembly includes an airbag supported by the crossbar. The assembly includes a controller programmed to position the crossbar in a raised position in response to a detected occupant egress.

The assembly may include the controller being programmed to position the crossbar in a lowered position in response to seat occupancy.

The assembly may include the controller being programmed to position the crossbar in the raised position in response to detected occupant ingress.

The assembly may further include a plurality of airbags including the airbag, the controller being programmed to, in response to a vehicle impact, select inflation of each airbag based on occupancy of the first seat and the second seat.

The assembly may further include the airbag being further defined as a first airbag and further comprising a second airbag, the first airbag being dedicated to the first seat, the controller being programmed to, in response to a vehicle impact, select inflation of the first airbag in response to the detection of an occupant in the first seat.

The assembly may include the first seat facing seat-forward toward the crossbar.

The assembly may include where the second airbag is dedicated to the second seat, the controller programmed to, in response a vehicle impact, select inflation of the second airbag in response to detection of an occupant in the second seat.

The assembly may include the first seat and the second seat being spaced from each other along a vehicle-longitudinal axis and the crossbar is between the first seat and the second seat.

The assembly may include the first seat and the second seat facing seat-forward toward the crossbar.

The assembly may include where the first airbag is inflatable from the crossbar toward the first seat and the second airbag is inflatable from the crossbar toward the second seat.

The assembly may further include a third seat spaced from the first seat along a cross-vehicle axis and the crossbar is between the second seat and the third seat.

The assembly may further include a third airbag, the controller programmed to, in response a vehicle impact, select inflation of the third airbag in response to detection of an occupant in the third seat.

The assembly may further include where the first seat and the third seat are spaced from each other along a cross-vehicle axis and the crossbar is spaced from the first seat and the third seat along a vehicle-longitudinal axis.

The assembly may further include a first pillar and a second pillar spaced cross-vehicle from the first pillar, the crossbar moveably supported by the first pillar and the second pillar.

The assembly may further include a first track supported by the first pillar and a second track supported by the second pillar, the crossbar being moveably supported by the first track and the second track.

With reference to the Figures, wherein like numerals indicate like parts throughout the several views, an assembly 10 for a vehicle 12 includes a first seat 14a and a second seat 14b. The assembly 10 includes a crossbar 16 positioned between the first seat 14a and the second seat 14b. The assembly 10 includes an airbag 18 supported by the crossbar 16. The assembly 10 includes a controller 20 programmed to position the crossbar 16 in a raised position in response to detected occupant 22 egress.

Figure 2:
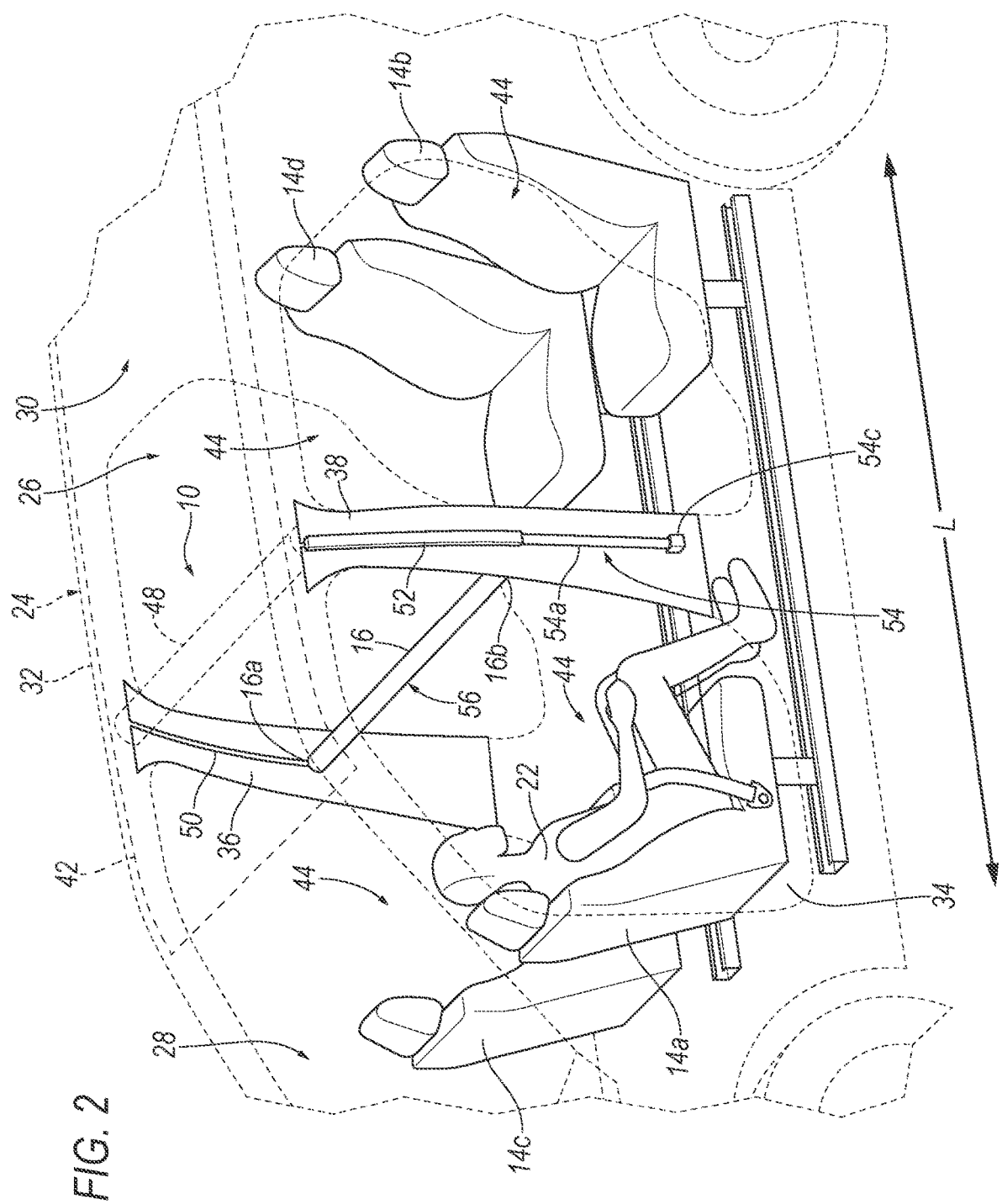
FIG. 2 is a perspective view of the vehicle with the plurality of seats including an occupant and the crossbar in the lowered position.

The crossbar 16 is positioned between the seats 14a, 14b such that the airbag controls the kinematics of an occupant 22 of at least one of the seats 14a, 14b in the event of a vehicle impact. The controller 20 is programmed to raise the crossbar 16 to the raised position, as shown in FIG. 1, in response to detected occupant 22 egress to increase space for the occupant 22 during egress. Similarly, as described further below, the controller 20 is programmed to lower the crossbar 16 to a lowered position, as shown in FIG. 2, in response to seat occupancy.

As described further below, the crossbar 16 may support a plurality of airbags 18 with each airbag dedicated to one of the plurality of seats 14. Each airbag is dedicated to one of the seats 14 in that the dedicated airbag is inflated during vehicle impact in response to occupancy of the seat to which the airbag is dedicated and controls the kinematics of at least the occupant 22 of that seat. While the dedicated airbag does control the kinematics of an occupant 22 of the seat to which the airbag is dedicated and is inflated in response to occupancy of that dedicated seat, it should be appreciated that in some examples the airbag may also be impacted by and/or control the kinematics of occupants 22 of other seats 14.

In the example shown in the figures, the plurality of airbags 18 includes a first airbag 18a, a second airbag 18b, a third airbag 18c, and a fourth airbag and the plurality of seats 14 includes the first seat 14a, the second seat 14b, a third seat 14c and a fourth seat 14d. The first airbag 18a is dedicated to the first seat 14a, the second airbag 18b is dedicated to the second seat 14b, the third airbag 18c is dedicated to the third seat 14c, and the fourth airbag is dedicated to the fourth seat 14d. In such an example, in the event of vehicle impact, the controller 20 is programmed to inflate the first airbag 18a in response to occupancy of the first seat 14a, to inflate the second airbag 18b in response to occupancy of the second airbag 18b, and so on. In other words, the controller 20 is programmed to not inflate the first airbag 18a during a vehicle impact when the first seat 14a is unoccupied.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a vehicle body 24. The vehicle body 24 includes body panels (not numbered) partially defining an exterior of the vehicle 12. The body panels may present a class-A surface, e.g., a finished surface exposed to view by a customer and free of unaesthetic blemishes and defects. The body panels include, e.g., a roof panel, etc.

The vehicle 12 includes a passenger compartment 26 to house occupants 22, if any, of the vehicle 12. The passenger compartment 26 may extend across the vehicle 12, i.e., from one side to the other side of the vehicle 12. The passenger compartment 26 includes a front end 28 and a rear end 30 with the front end 28 being in front of the rear end 30 during forward movement of the vehicle 12.

The vehicle body 24 may include a vehicle roof 32 spaced upwardly from a vehicle floor 34. The vehicle body 24 includes pillars 36, 38, extending from the vehicle floor 34 to the vehicle roof 32. The vehicle roof 32 is supported by the pillars 36, 38. For example, the vehicle body 24 may include an A-pillar (not numbered) and a B-pillar on each side of the vehicle 12. In the example shown in the Figures, the vehicle 12 includes a first pillar 36 and a second pillar 38 spaced cross-vehicle from each other. The first pillar 36 and the second pillar 38 are the B-pillars of the vehicle 12. The A-pillars may extend between a windshield and front doors. In other words, the A-pillars may be disposed at the front end 28 of the passenger compartment 26. The B-pillars may extend behind the front doors, e.g., between adjacent doors. In other words, the B-pillars may be spaced from the A-pillars by a front door opening. The vehicle 12 may include additional pillars (not numbered), e.g., C-pillars, D-pillars. The pillars 36, 38 may extend from the roof to the floor.

The vehicle 12 may include a headliner 42 supported by the vehicle body 24, specifically, the vehicle roof 32. The headliner 42 may conceal the vehicle roof 32 from view inside the vehicle 12, i.e., in the passenger compartment 26 of the vehicle 12. The headliner 42 includes a class-A surface facing the passenger compartment 26, i.e., a surface specifically manufactured to have a high quality, finished, aesthetic appearance free of blemishes. The headliner 42 may be any suitable material, for example, fabric, leather, a polymeric panel, etc.

With continued reference to FIGS. 1-4B, the vehicle 12 may include the plurality of seats 14. The seats 14 are supported by the vehicle floor 34. The seats 14 may be arranged in any suitable arrangement in the passenger compartment 26. The vehicle 12 may include any suitable number of seats 14. The plurality seats 14 may be movable relative to the vehicle floor 34 to various positions, e.g., movable fore-and-aft and/or cross-vehicle.

As an example, shown in the Figures, the vehicle 12 includes four seats 14, namely, the first seat 14a, the second seat 14b, the third seat 14c, and the fourth seat 14d. The first seat 14a and the third seat 14c are spaced from each other on the cross-vehicle axis. The second seat 14b and the fourth seat 14d are spaced from each other on the cross-vehicle axis. The first seat 14a and the third seat 14c are spaced from the second seat 14b and the fourth seat 14d on the vehicle-longitudinal axis. In this example, the first seat 14a and the third seat 14c are at the rear end 30 of the passenger compartment 26 and the second seat 14b and the fourth seat 14d are at the front end 28 of the passenger compartment 26. As an example shown in the figures, the seats 14a, 14b, 14c, 14d may be positioned in a rectangular configuration. In other examples, the vehicle 12 may include any suitable number of seats 14 arranged in any suitable configuration.

With continued reference to the example shown in the Figures, the first seat 14a and the third seat 14c face seat-forward toward the crossbar 16. Specifically, the first seat 14a and the third seat 14c may be facing the rear end 30 of the passenger compartment 26, e.g., when an occupant 22 occupies the first seat 14a or the third seat 14c, the occupant 22 faces the rear end 30 of the passenger compartment 26. The second seat 14b and the fourth seat 14d may be forward facing. Specifically, the second seat 14b and the fourth seat 14d may be facing the rear end 30 front end 28 of the passenger compartment 26, e.g., when an occupant 22 occupies the second seat 14b or the fourth seat 14d, the occupant 22 faces the front end 28 of the passenger compartment 26.

As shown in the Figures, the first seat 14a and the third seat 14c may face the second seat 14b and the fourth seat 14d. In other words, as described above, the first seat 14a and the second seat 14b are spaced from each other along the vehicle-longitudinal axis, and the third seat 14c and the fourth seat 14d are spaced from each other along the vehicle-longitudinal axis.

The seats 14 each include a seatback (not numbered), a seat bottom (not numbered), and a head restraint (not numbered). The head restraint may be supported by and extending upwardly from the seatback. The head restraint may be stationary or movable relative to the seatback. The seatback may be supported by the seat bottom and may be stationary or movable relative to the seat bottom. The seatback, the seat bottom, and the head restraint may be adjustable in multiple degrees of freedom. Specifically, the seatback, the seat bottom, and the head restraint may themselves be adjustable. In other words, adjustable components within the seatback, the seat bottom, and the head restraint may be adjustable relative to each other.

The seats 14 include an occupant seating area 44. As shown in the Figures, the seatback and the seat bottom define the occupant seating area 44 of the seat. The occupant seating area 44 is the area occupied by an occupant 22 when properly seated on the seat bottom and the seatback. The occupant seating area 44 is in a seat-forward direction of the seatback and above the seat bottom. In other words, the seat-forward direction is the direction the occupant 22 faces when properly seated on the seat bottom and the seatback.

As one example, the occupant 22 of the seat may be looking in the seat-forward direction and be looking at the rear end 30 of the passenger compartment 26. In the example shown in the figures, the crossbar 16 is seat forward of each of the seats 14a, 14b, 14c, 14d.

With reference to the Figures, the assembly 10 includes the crossbar 16. The crossbar 16 may move from the raised position and the lowered position depending on occupancy of the vehicle 12. When occupants 22 intend to enter the vehicle 12, the crossbar 16 moves to the raised position to allow space in the passenger compartment 26 for the occupants 22 to enter the vehicle 12. When occupants 22 are seated in one or more of the seats 14 in the vehicle 12, the crossbar 16 moves to the lowered position in front of the occupant seating area 44. As an example, shown in FIGS. 2-4B and described below, in the lowered position the crossbar 16 is between the occupant seating areas 44 of the first seat 14a and the second seat 14b. In other words, in the lowered position the crossbar 16 is between the first seat 14a and the second seat 14b. When occupants 22 intend to exit the vehicle 12, the crossbar 16 moves to the raised position to allow space in the passenger compartment 26 for the occupants 22 to exit the vehicle 12. Intention to exit the vehicle 12 may be detected in any suitable way and, for example, may be detected by an occupancy sensor 46. As an example the occupancy sensor 46 may detect an intention to exit the vehicle 12, e.g., by initial movement of the occupant 22 from the seat as detected by a weight sensor, image detector, etc., or by detection of a seatbelt latch being unbuckled from a seatbelt buckle for that particular seat.

The crossbar 16 is elongated from the first pillar 36 to the second pillar 38. In other words, the crossbar 16 extends across the vehicle 12 in the cross-vehicle direction. The crossbar 16 is movably supported by the first pillar 36 and the second pillar 38. Specifically, the crossbar 16 is movable along the first pillar 36 and the second pillar 38 from the raised position to the lowered position. The crossbar 16 may extend between a first end 16a and a second end 16b. As shown in the Figures, the first end 16a is movably supported by the first pillar 36 and the second end 16b is movably supported by the second pillar 38. In the lowered position, the crossbar 16 may be spaced downwardly from the vehicle roof 32 and spaced upwardly from the vehicle floor 34. The crossbar 16 may be in the lowered position when occupants 22 are seated in the seats 14. In the raised position, the vehicle roof 32 may receive the crossbar 16 in the raised position. Specifically, as shown in the example in the Figures, the vehicle roof 32 and headliner 42 may define a slot 48 elongated from the first pillar 36 to the second pillar 38. In such an example, the crossbar 16 may move into the slot 48 and is in the slot 48 when in the raised position. In other words, the slot 48 allows the crossbar 16 to be recessed into the vehicle roof 32 and headliner 42 when the crossbar 16 is in the raised position. The crossbar 16 may be in the raised position when occupants 22 of the seats 14 are entering and exiting the vehicle 12.

The crossbar 16 may be elongated between a pair of the seats 14. As described above, the crossbar 16 may be between the first seat 14a and the second seat 14b, and between the third seat 14c and the fourth seat 14d. Specifically, the crossbar 16 may be between the occupant seating areas 44 of the first seat 14a and the second seat 14b and between the occupant seating areas 44 of the third seat 14c and the fourth seat 14d when the crossbar 16 is in the lowered position. In other words, as shown in FIGS. 2-4B, the crossbar 16 may be between the occupant seating areas 44 of the third seat 14c and the second seat 14b and the crossbar 16 may between the occupant seating areas 44 of the first seat 14a and the fourth seat 14d.

The assembly 10 may include a first track 50 supported by the first pillar 36 and a second track 52 supported by the second pillar 38. The crossbar 16 is moveably supported by the first track 50 and the second track 52. Specifically, the first end 16a of the crossbar 16 is moveably supported by the first track 50 and the second end 16b of the crossbar 16 is moveably supported by the second track 52. As the crossbar 16 moves between the raised position and the lowered position, the first end 16a and the second end 16b of the crossbar 16 move along the first track 50 and the second track 52.

Figure 6:
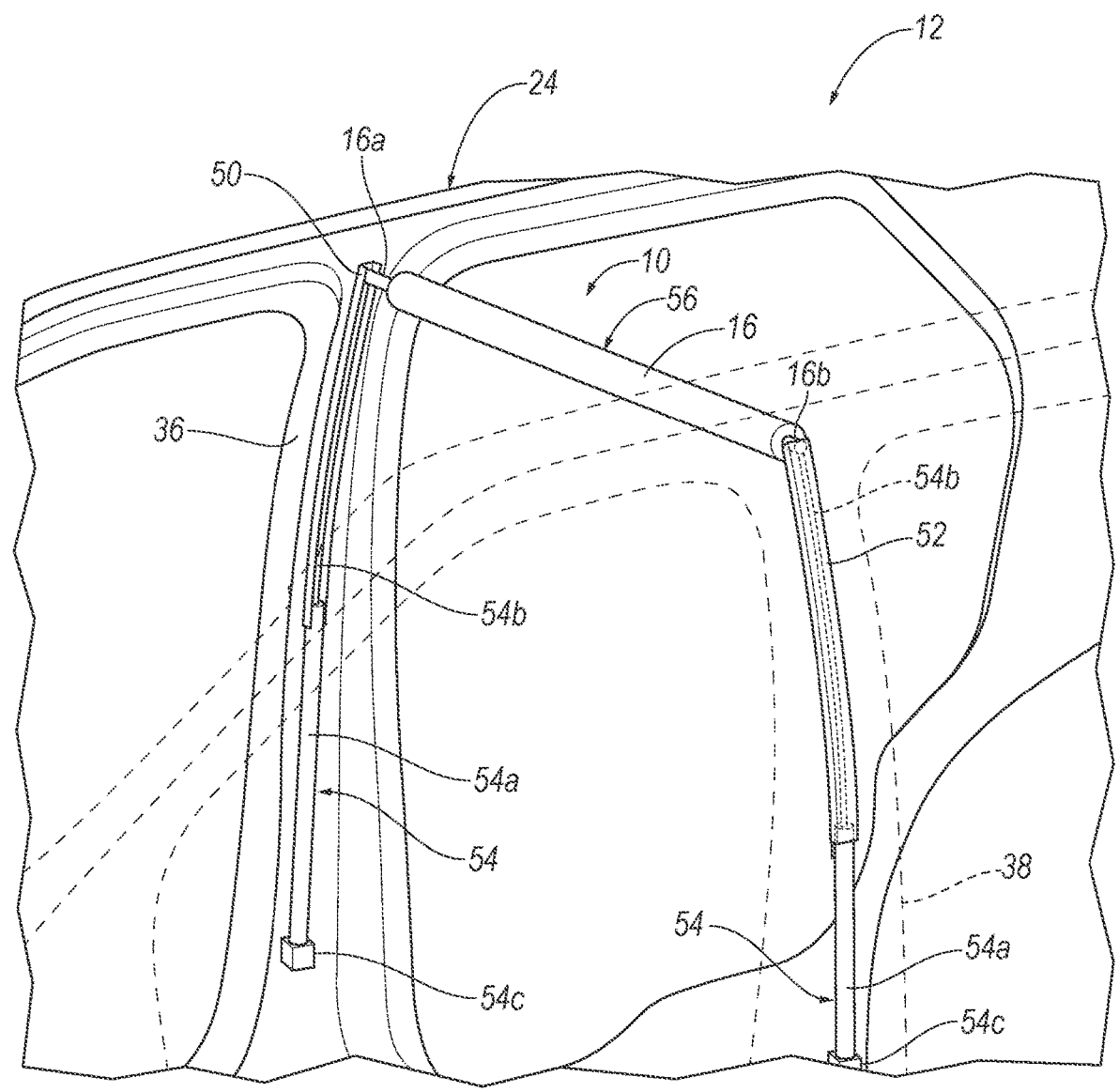
FIG. 6 is a perspective view of the crossbar in the raised position.
Figure 7:
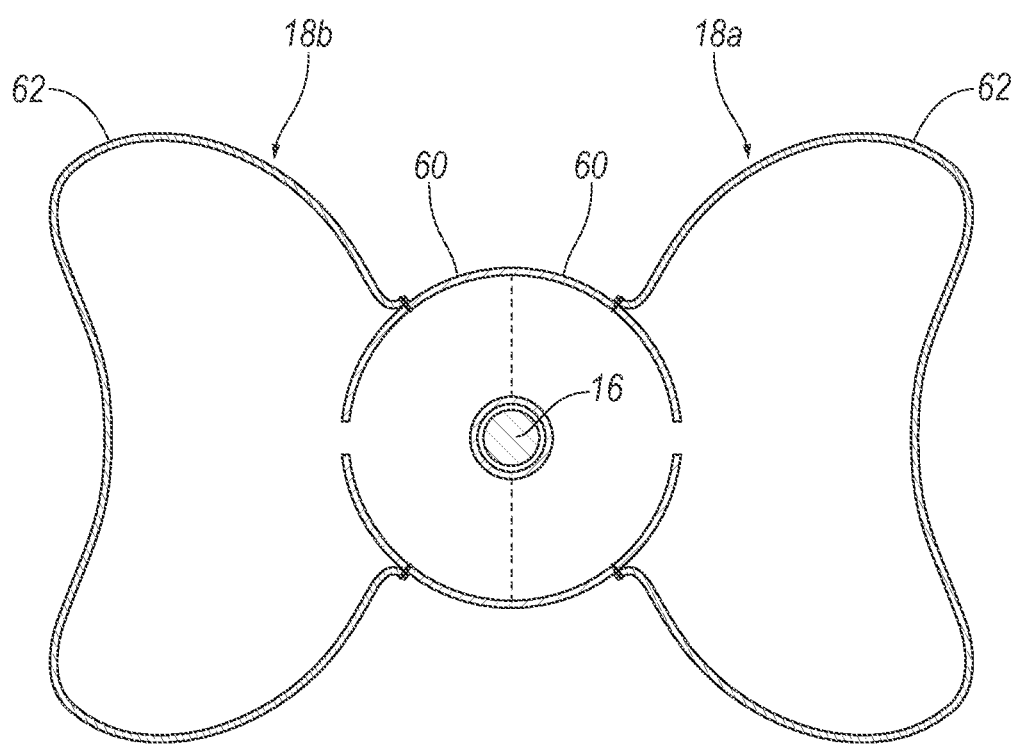
FIG. 7 is a cross-sectional view of FIGS. 3A and 3B.

With reference to FIG. 6, the assembly 10 includes a linear actuator 54 supported by one of the first pillar 36 or the second pillar 38. The crossbar 16 is moveable by the linear actuator 54 from the raised position to the lowered position. Specifically, the crossbar 16 is moveable by the linear actuator 54 along the first track 50 and the second track 52 from the raised position to the lowered position. The linear actuator 54 may be coupled to one of the ends of the crossbar 16. The linear actuator 54 moves the ends of the crossbar 16 between the lowered position and the raised position. The assembly 10 may include any suitable number of linear actuators 54 to move the crossbar 16 between the lowered position and the raised position. For example, as shown in the Figures, the assembly 10 may include a linear actuator 54 supported by the first pillar 36 and a linear actuator 54 supported by the second pillar 38.

The linear actuator 54 may include a housing 54a and a screw rod 54b movable into and out of the housing 54a. The screw rod 54b may extend from the housing 54a to one of the ends of the crossbar 16. The screw rod 54b may be fully extended from the housing 54a when the crossbar 16 is in the raised position and the screw rod 54b may be retracted into the housing 54a when the crossbar 16 is in the lowered position. The linear actuator 54 includes a motor 54c. The motor 54c may be coupled to the screw rod 54b of the linear actuator 54 to move the screw rod 54b to move the crossbar 16 between the raised position and the lowered position.

The crossbar 16 may be spring-loaded between the first pillar 36 and the second pillar 38. Specifically, the first end 16a and the second end 16b of the crossbar 16 may be spring-loaded. As the crossbar 16 moves between the raised position and the lowered position, the crossbar 16 being spring-loaded allows the crossbar 16 to follow the contours of the pillars 36, 38. As shown in the Figures, the distance from the first pillar 36 to the second pillar 38 may change as the pillar extends from the vehicle roof 32 to the vehicle floor 34. The length of the crossbar 16 may vary at the ends based on the contours as the crossbar 16 moves along the pillars 36, 38, because the crossbar 16 is spring loaded, between the raised position and the lowered position.

Figure 5:
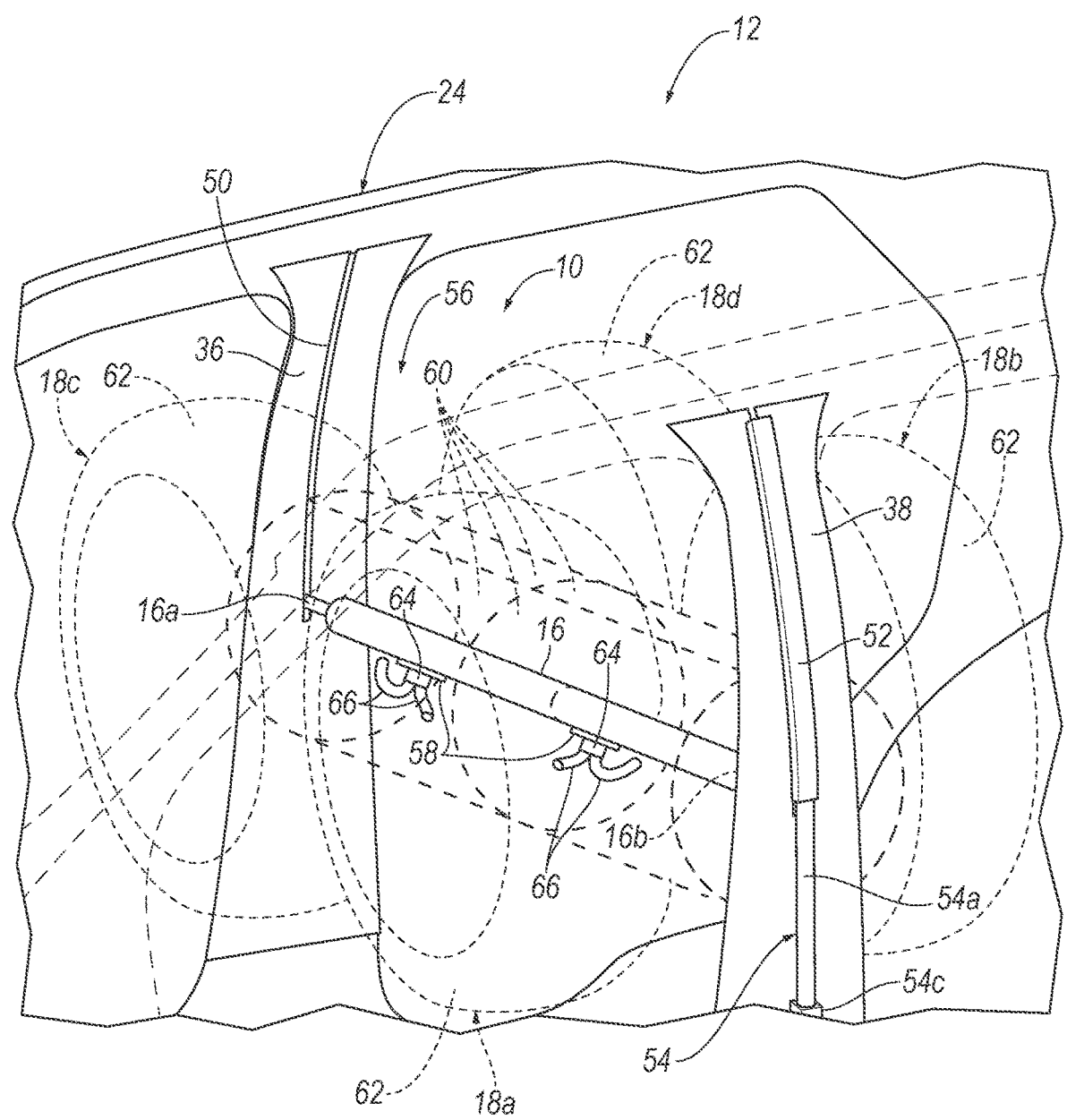
FIG. 5 is a perspective view of an airbag assembly in the inflated position including the first airbag, the second airbag, the third airbag and a fourth airbag.

With reference to FIG. 5, the assembly 10 includes an airbag assembly 56 supported by the crossbar 16. The airbag assembly 56 includes the plurality of airbags 18, an inflator 58, and may include a housing (not shown). The plurality of airbags 18, the inflator 58, and the housing may be supported by the crossbar 16.

As shown in FIG. 5, the inflator 58 is supported on the crossbar 16. The inflator 58 is in fluid communication with the airbags 18. The inflator 58 expands the airbag with inflation medium, such as a gas, to move the airbag from an uninflated position to an inflated position. The inflator 58 may be, for example, a pyrotechnic inflator that ignites a chemical reaction to generate the inflation medium, a stored gas inflator that releases (e.g., by a pyrotechnic valve) stored gas as the inflation medium, or a hybrid. The airbag assembly 56 may include any suitable number of inflators 58. In the example shown in FIG. 5, the airbag assembly 56 includes two inflators 58 to inflate the airbag to the inflated position. In other examples, the size and quantity of the inflator 58 may be adjusted to inflate the airbag to the inflated position, e.g., the airbag assembly 56 may include one inflator 58 that is large enough to move the airbag to the inflated position.

As discussed above, the plurality of airbags 18 are supported by the crossbar 16. When the crossbar 16 is in the raised position, the airbags 18 are in the uninflated position. Specifically, the plurality of airbags 18 may be folded to surround the crossbar 16 when the crossbar 16 is in the raised position and the plurality of airbags 18 are in the uninflated position. When the crossbar 16 is in the lowered position, the airbags 18 are in the uninflated position during normal operation of the vehicle 12. In the event of an impact to the vehicle 12 and when the crossbar 16 is in the lowered position, the airbags 18 may be selectively inflated to the inflated position based on seat occupancy, i.e., one of the airbags 18 is inflated if the seat to which that airbag is dedicated is occupied. When in the inflated position, the airbags 18 surround the crossbar 16. The airbags 18 inflate to the inflated position between the crossbar 16 and the seats 14 of the vehicle 12. Specifically, the airbags 18 inflate to the inflated position between the crossbar 16 and the occupant seating areas 44 of the seats 14 of the vehicle 12. In the event of a vehicle impact, the plurality of airbags 18 may inflate to the inflated position to control kinematics of occupants 22 seated in the seats 14 of the vehicle 12.

With reference to the Figures, the airbag assembly 56 may include any suitable number of airbags 18 supported by the crossbar 16 and extending from the crossbar 16 in the inflated position. The airbag assembly 56 may include a number of airbags 18 that is equal to the number of seats 14 facing the crossbar 16. As described above, the first airbag 18*a* inflates from the crossbar 16 toward the first seat 14*a* and the second airbag 18*b* inflates from the crossbar 16 toward the second seat 14*b*, etc.

With reference to the Figures, each airbag includes a base portion 60 supported on the crossbar 16 and a pillow portion 62 supported on the base portion 60. As an example shown in the figures, the base portion 60 is elongated along the crossbar 16. As shown in FIG. 5, when inflated simultaneously, the base portions 60 surround the crossbar 16 in the inflated position. In such an example, the crossbar 16 is elongated through a center of the base portions 60 and the base portions 60 completely surround the crossbar 16. The base portions 60 of adjacent airbags 18 may share walls. In other words, in the inflated position the base portions 60 of adjacent airbags 18 may abut each other. For example, when the first, second, and third airbags 18*a*, 18*b*, 18*c* are in the inflated position, the base portion 60 of the first airbag 18*a* may abut the base portion 60 of the third airbag 18*c* and the base portion 60 of the second airbag 18*b*.

The base portions 60 are fluidly connected with the corresponding pillow portions 62. In other words, the inflation medium may freely pass from the inflator 58, through the base portion 60 and into the pillow portion 62. The airbag assembly 56 may include a manifold 64 connected to the inflator 58 and a plurality of fill tubes 66 extending from the manifold 64 to the plurality of airbags 18. The manifold 64 allows inflation medium to pass from the inflator 58 to the airbags 18. As an example shown in the Figures, the manifold 64 may connect to two fill tubes 66. As described below, the controller 20 may instruct the manifold 64 to allow inflation medium to pass through one or both fill tubes 66. In other words, the plurality of airbags 18 are selectively inflated based on the instructions from the controller 20 to the manifold 64.

The crossbar 16 is rigid relative to the airbag assembly 56. The crossbar 16 may be of any suitable material that is rigid relative to the airbag assembly 56, e.g., a metal or a plastic. The rigidity of the crossbar 16 relative to the airbag assembly 56 allows the crossbar 16 to act as a reaction surface for the airbag assembly 56 in the inflated position. The crossbar 16 supports the airbag assembly 56 and acts as a reaction surface for the airbags 18 when in the inflated position.

The airbags 18 may be fabric, e.g., a woven polymer. For example, the fabric may be woven nylon yarn, for example, nylon. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 9:
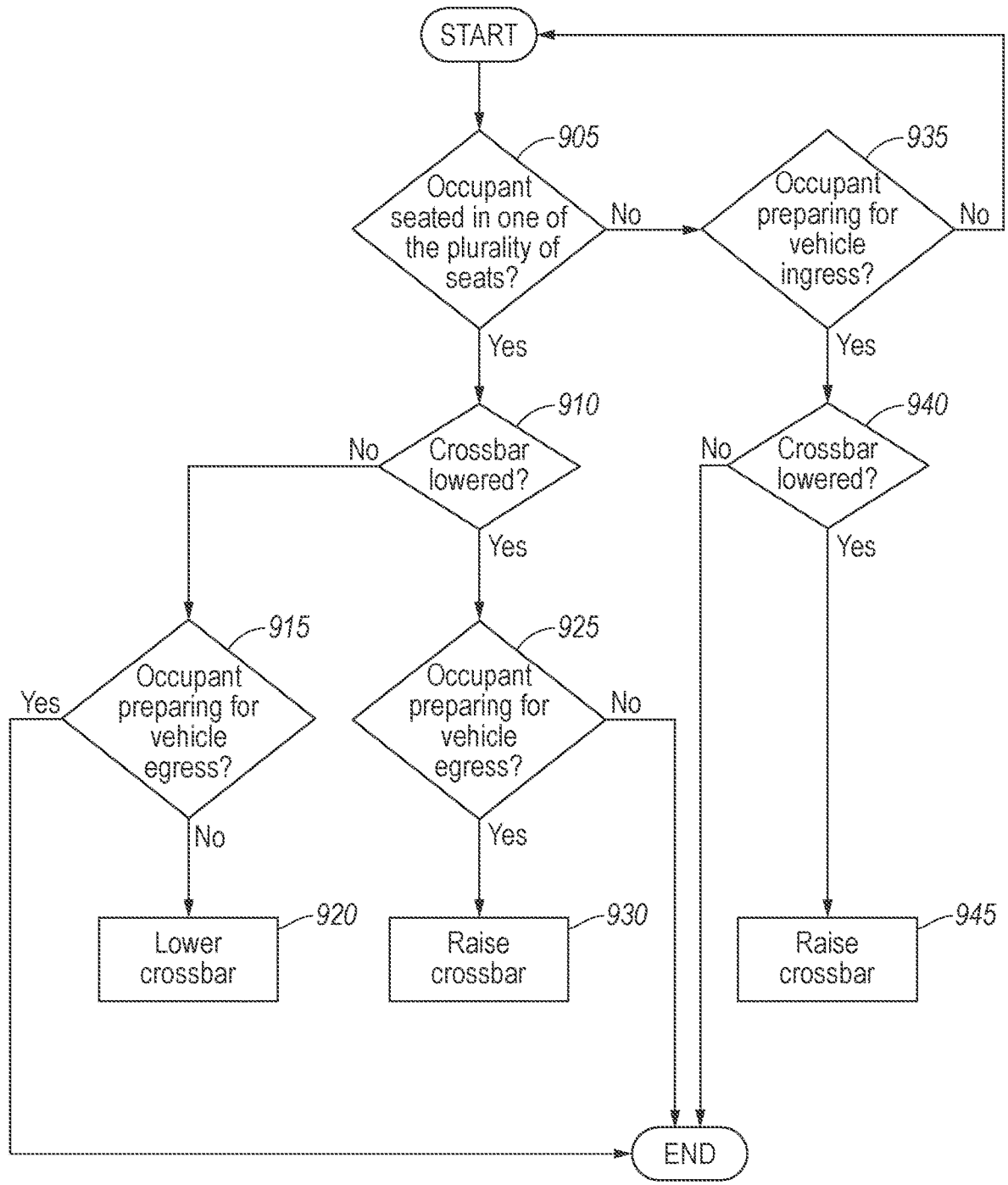
FIG. 9 is a block diagram of a method of moving the crossbar from the raised position to the lowered position.
Figure 10:
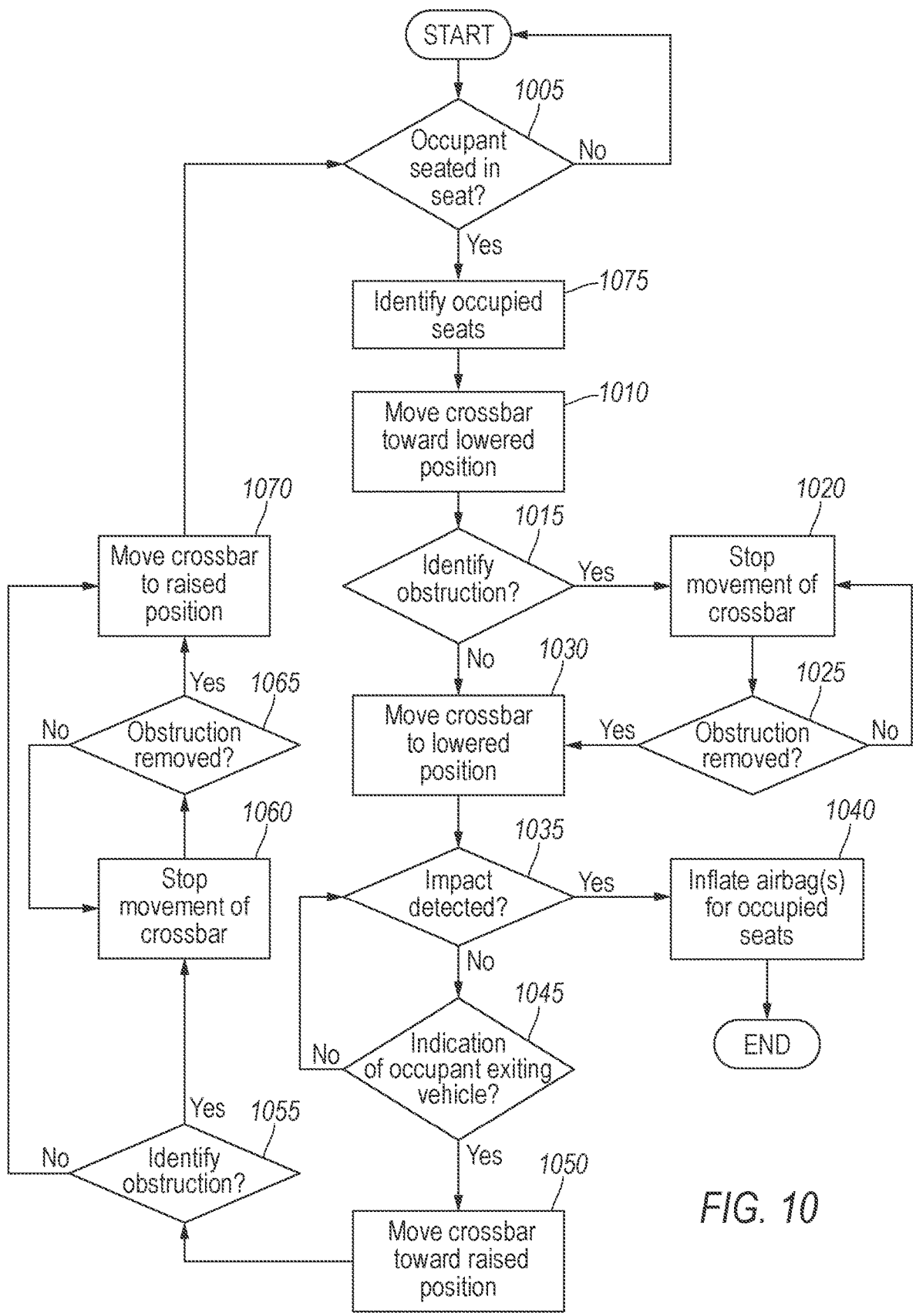
FIG. 10 is a block diagram of a method of moving the crossbar from between the raised position and the lowered position and selectively inflating the airbags.

With reference to FIGS. 9-10, the controller 20 stores instructions to control components of the vehicle 12 according to the method shown in FIGS. 9-10. Specifically, the controller 20 may be a restraints control module. Use of "based on" and "in response to" herein, including with reference to the instructions stored by the controller 20 and the method, indicates a causal relationship, not merely a temporal relationship.

Figure 8:
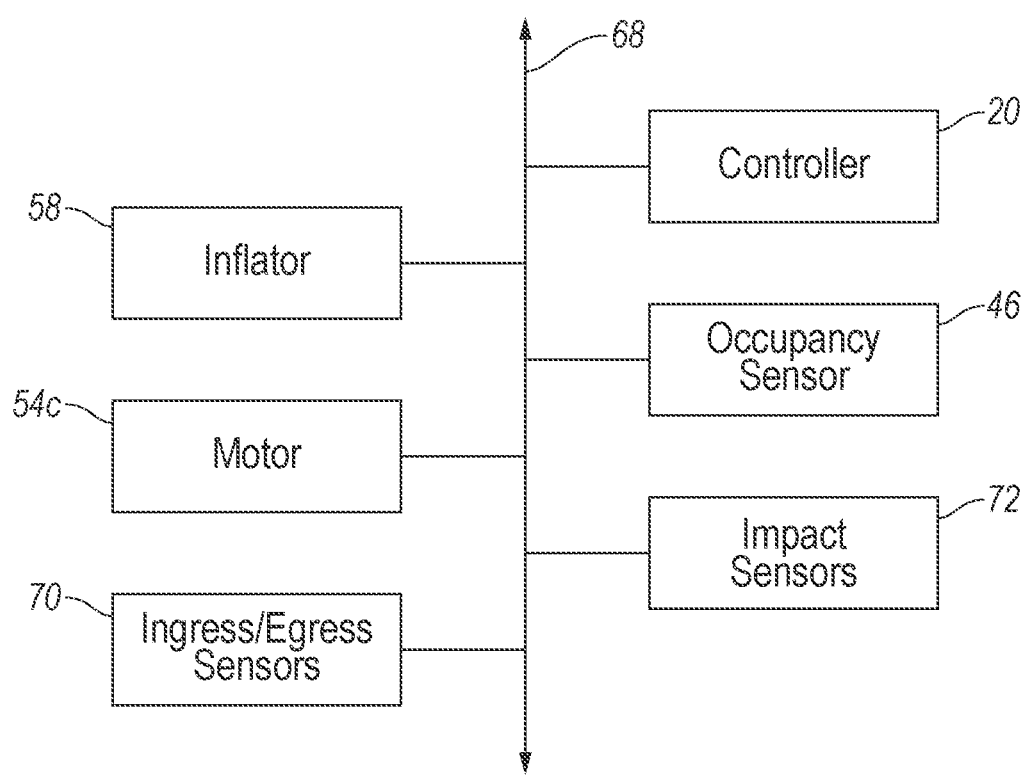
FIG. 8 is a block diagram of a vehicle communication network.

The controller 20 includes a processor and a memory. The memory includes one or more forms of computer readable media, and stores instructions executable by the controller 20 for performing various operations, including as disclosed herein. As described below, the controller 20 is programmed to perform a specific function or a specific set of functions. The memory can be of any type, e.g., hard disk drives, solid state drives, servers, or any volatile or non-volatile media. The memory can store the collected data sent from the sensors. The memory can be a separate device from the controller 20, and the controller 20 can retrieve information stored by the memory via a network in the vehicle 12, e.g., over a CAN bus, a wireless network, etc. Alternatively or additionally, the memory can be part of the controller 20, e.g., as a memory of the controller 20. The controller 20 may include or be communicatively coupled to, e.g., via a vehicle network such as a communications bus as described further below, more than one processor, e.g., included in components such as sensors, electronic control units (ECUs) or the like included in the vehicle 12 for monitoring and/or controlling various vehicle 12 components. As shown in FIG. 8, the controller 20 is generally arranged for communications on a vehicle communication network 68 that can include a bus in the vehicle 12 such as a controller 20 area network CAN or the like, and/or other wired and/or wireless mechanisms. Further, as mentioned below, various sensors may provide data to the controller 20 via the vehicle communication network 68.

The vehicle 12 may include one or more ingress/egress sensor 70 to identify whether an occupant 22 is entering or exiting the vehicle 12. The controller 20 may be in communication with the ingress/egress sensor 70. The ingress/egress sensor 70 may detect movement of the occupant 22. As one example, the occupant 22 may be seated in the seat and the ingress/egress sensor 70 may detect movement of the occupant 22 to exit the vehicle 12, e.g., unbuckling of a seatbelt, standing up from the seat, opening the door of the vehicle 12, etc. As another example, the ingress/egress sensor 70 may detect movement of an occupant 22 outside of the vehicle 12 to enter the vehicle 12, e.g., movement to the door, opening the door, etc.

The ingress/egress sensors 70 may be positioned on the interior or the exterior of the vehicle 12. For example, the ingress/egress sensors 70 may be in the passenger compartment 26. The ingress/egress sensor 70 may be one or a combination of various sensors including, for example, a motion sensor, image detection, proximity sensor, seatbelt buckle sensor, door sensor (to detect opening and closing of the door), etc.

The vehicle 12 may include the occupancy sensors 46 to detect occupancy of one of the seats 14, i.e., the presence or absence of the occupant 22 in the seat. The occupancy sensor 46 may detect that the occupant 22 is seated in a particular seat, e.g., the first seat 14*a*, the second seat 14*b*, etc. The occupancy sensor 46 may detect that no occupant 22 is seated in a particular seat, e.g., the first seat 14*a*, the second seat 14*b*, etc. The occupancy sensors 46 may be coupled to the seats 14 to identify when an occupant 22 is seated in the seats 14 or may be spaced from the seats 14. The occupancy sensor 46 may be, for example, a weight sensor (i.e., in the seat), an image detector (e.g., spaced from the seat and configured to detect an occupant 22, or lack thereof, based on image detection), a seatbelt buckle sensor that detects engagement of a seatbelt latch, or lack thereof, with a seatbelt buckle, etc. The vehicle 12 may include any suitable number of occupancy sensors 46. For example, the vehicle 12 may include a number of occupancy sensors 46 equal to the number of seats 14 in the vehicle 12.

The controller 20 may be in communication with the occupancy sensors 46. As one example, the occupancy sensor 46 may detect that the occupant 22 has occupied the seat. As another example, the occupancy sensor 46 may detect that the occupant 22 is no longer seated in the seat. The controller 20 may use the occupancy sensor 46 and the ingress/egress sensor 70 together to detect the position of the occupant 22 in the vehicle 12.

The vehicle 12 may include at least one impact sensor 72 for sensing impact of the vehicle 12, and the controller 20 may be in communication with the impact sensors 72. The impact sensor 72 is configured to detect an impact to the vehicle 12. The impact sensor 72 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 72 may be located at numerous points in or on the vehicle 12.

The vehicle 12 includes the controller 20 programmed to position the crossbar 16 in the raised position in response to detected occupant 22 egress. As described above, the vehicle 12 may include sensors to detect occupant 22 egress, e.g., ingress/egress sensors 70 and occupancy sensors 46. In response to the information from the sensors, the controller 20 instructs the motor 54*c* to extend the screw rod 54*b* to raise the crossbar 16 to the raised position to allow the occupant 22 to exit the vehicle 12. In an example where the ingress/egress sensor 70 is the seatbelt buckle sensor, the ingress/egress sensor 70 may detect the occupant 22 unbuckling their seatbelt and thus preparing to egress the vehicle 12. As another example, where the ingress/egress sensor 70 is the motion sensor or the image detection sensor, the ingress/egress sensor 70 may detect the occupant 22 exhibiting behaviors consistent with preparing to egress the vehicle 12. As another example, where the ingress/egress sensor 70 is the proximity sensor, the ingress/egress sensor 70 may detect the occupant 22 moving away from the seat in a manner that is consistent with preparing to egress the vehicle 12. In response to the ingress/egress sensor 70 detection (e.g., seatbelt unbuckle, motion or image detection, proximity detection, etc.), the controller 20 instructs the motor 54*c* to extend the screw rod 54*b* to raise the crossbar 16 to the raised position to allow the occupant 22 to exit the vehicle 12.

The controller 20 may be programmed to position the crossbar 16 in the raised position in response to detected occupant 22 ingress. As described above, the vehicle 12 may include sensors to detect occupant 22 ingress, e.g., ingress/egress sensors 70. The ingress/egress sensor 70 may, for example, detect movement of the occupant 22 approaching the vehicle 12 that is consistent with an occupant 22 preparing to enter the vehicle 12. As another example, the ingress/egress sensor 70 may, for example, detect the door of the vehicle 12 opening. In response to the information from the sensors, the controller 20 instructs the screw rod 54*b* to extend and raise the crossbar 16 to the raised position to allow the occupant 22 to enter the vehicle 12.

The controller 20 may be programmed to position the crossbar 16 in a lowered position in response to seat occupancy. As described above, the vehicle 12 may include occupancy sensors 46 to detect occupancy of the seat, i.e., the presence or absence of the occupant 22 in the seat. The occupancy sensor 46 may, for example, detect that the occupant 22 is seated in the seat. In response to the information from the sensor, the controller 20 instructs the screw rod 54*b* to retract and lower the crossbar 16 to the lowered position.

The controller 20 may be programmed to, in response to a vehicle impact, select inflation of each airbag based on occupancy of seats 14. For example, if the occupancy sensor 46 detects that the first seat 14*a* is occupied, the controller 20 selects to inflate the first airbag 18*a* in response to a vehicle impact and if the occupancy detects that the first seat 14*a* is not occupied, the controller 20 selects to not inflate the first airbag 18*a* in response to a vehicle impact, etc.

Figure 3A:
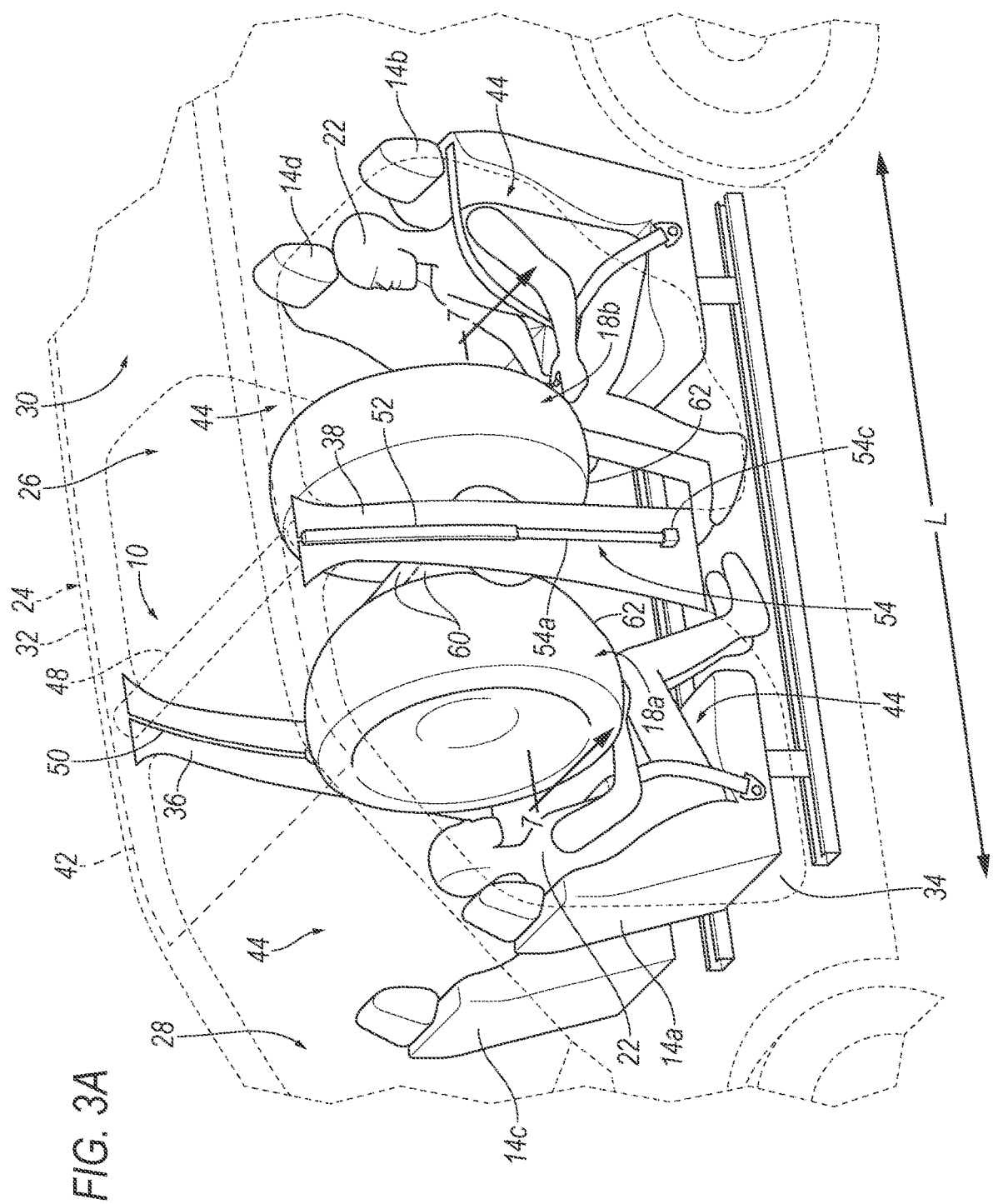
FIG. 3A is a perspective view of the vehicle with a first airbag inflated toward an occupant in a first seat, and a second airbag inflated toward an occupant in a second seat.
Figure 3B:
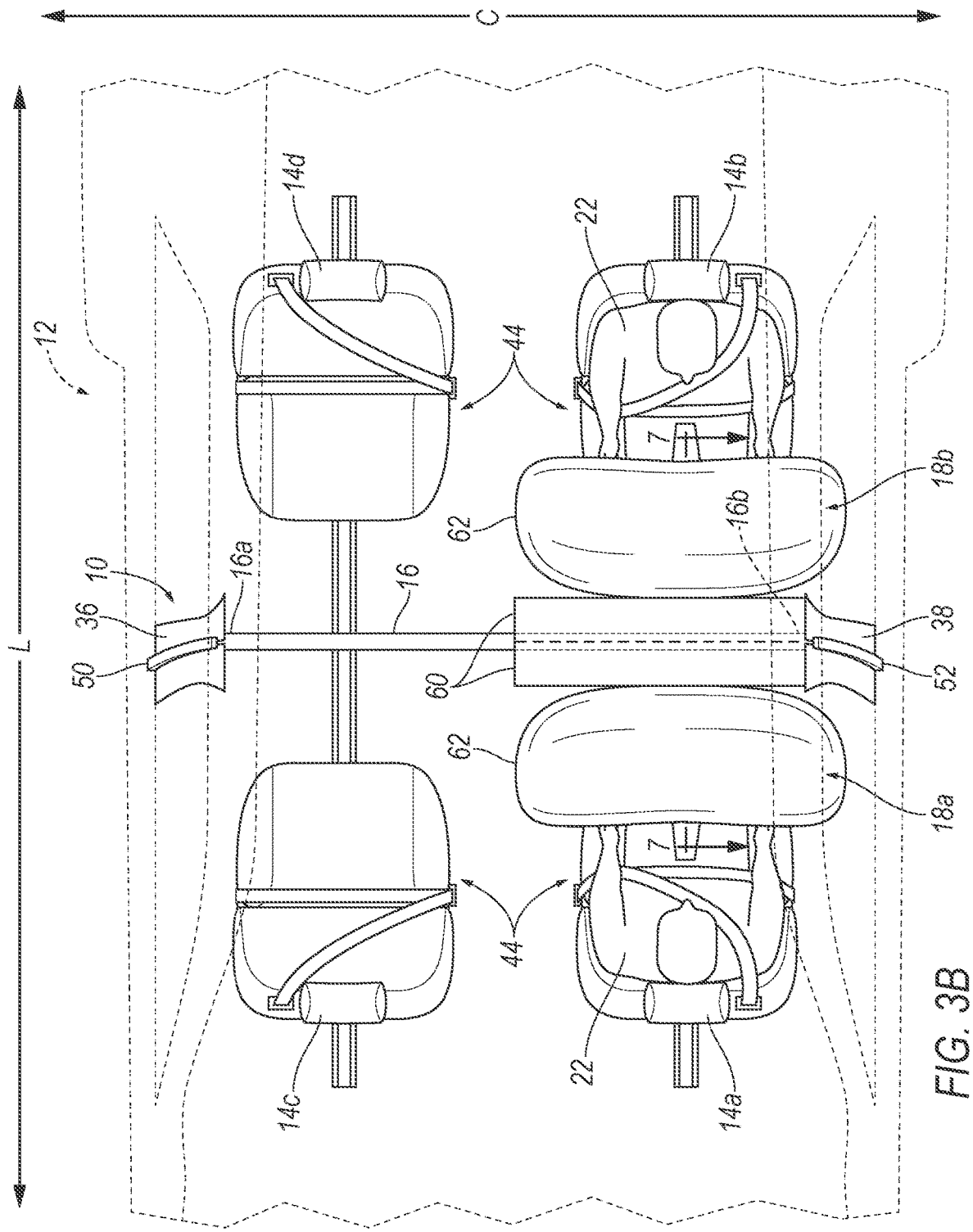
FIG. 3B is a top view of FIG. 3A.
Figure 4A:
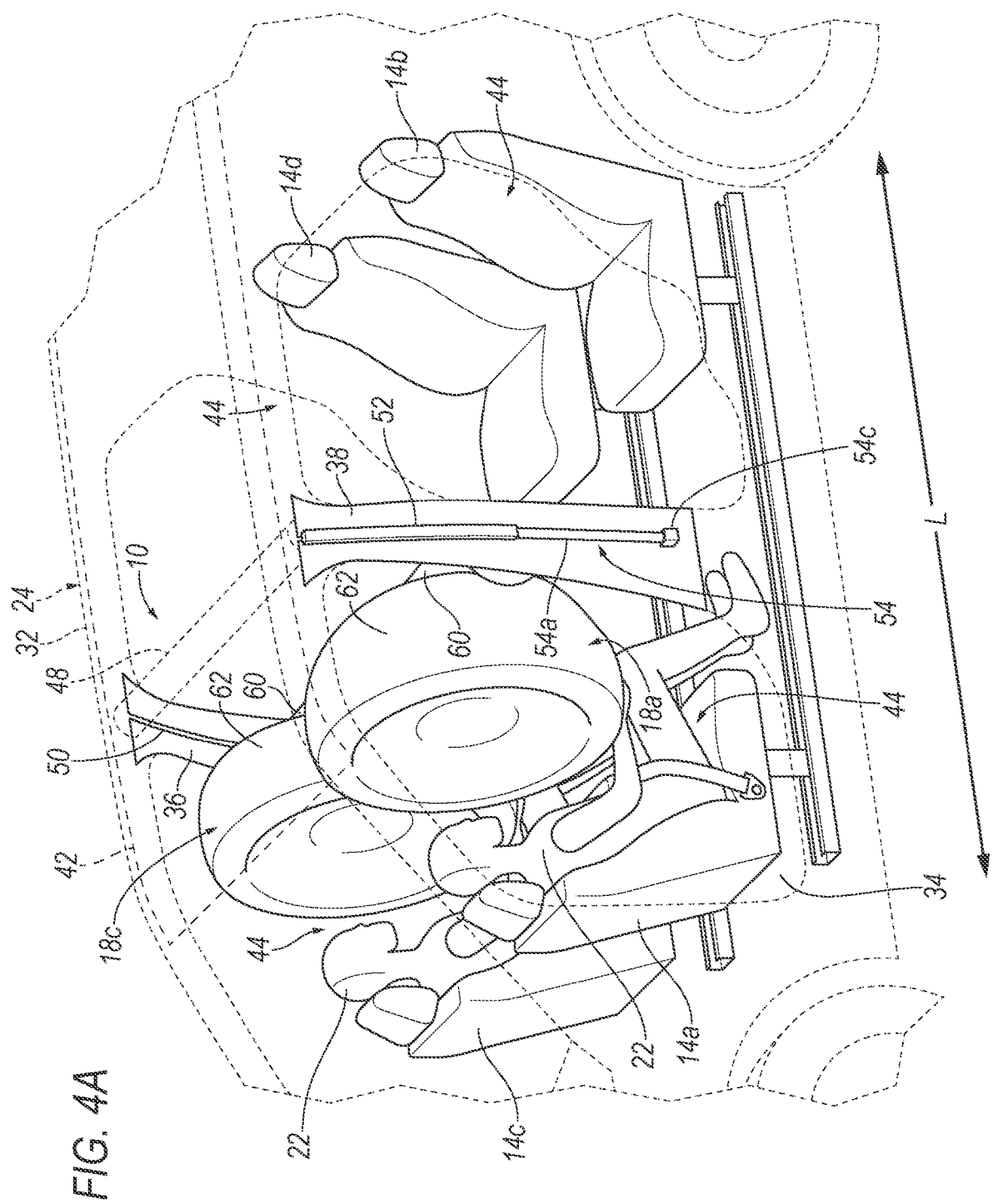
FIG. 4A is a perspective view of the vehicle with the first airbag inflated toward the occupant in the first seat and a third airbag inflated toward an occupant in a third seat.
Figure 4B:
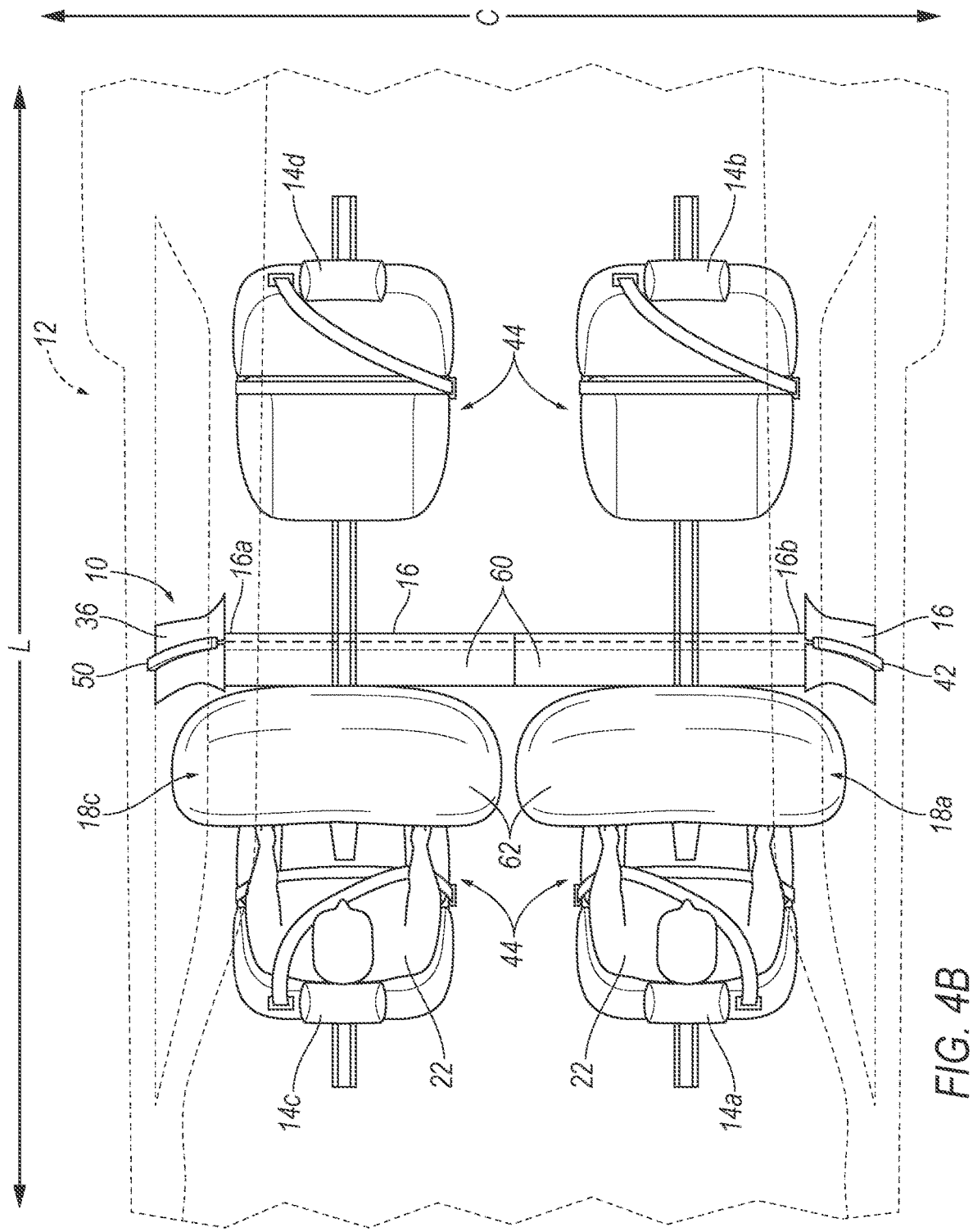
FIG. 4B is a top view of FIG. 4A.

As an example, shown in FIGS. 3A-3B, the first seat 14*a* and the second seat 14*b* are occupied by the occupants 22 and the third seat 14*c* and the fourth seat 14*d* are not occupied by the occupants 22. In this example, the controller 20 is programmed to, in response to a vehicle impact, select inflation of the first airbag 18*a* in response to the detection of an occupant 22 in the first seat 14*a*. With continued reference to FIGS. 3A-3B, the controller 20 may be programmed to, in response to a vehicle impact, select inflation of the second airbag 18*b* in response to the detection of an occupant 22 in the second seat 14*b*.

As another example, shown in FIGS. 3A-3B, the first seat 14*a* and the third seat 14*c* are occupied by the occupants 22 and the second seat 14*b* and the fourth seat 14*d* are not occupied by the occupants 22. In this example, the controller 20 is programmed to, in response to a vehicle impact, select inflation of the first airbag 18*a* in response to the detection of an occupant 22 in the first seat 14*a*. With continued reference to FIG. 3A-3B, the controller 20 may be programmed to, in response to a vehicle impact, select inflation of the third airbag 18*c* in response to the detection of an occupant 22 in the third seat 14*c*.

As another example not shown in the Figures, the fourth seat 14*d* may be occupied by the occupant 22, and the first, second, and third seat 14*c* are not occupied by the occupants 22. In this example, the controller 20 is programmed to, in response to a vehicle impact, select inflation of the fourth airbag in response to the detection of an occupant 22 in the fourth seat 14d.

As another example shown in the method in FIG. 10, the controller 20 may identify when to move the crossbar 16 to the lowered position and to the raised position based occupants 22 entering or exiting the vehicle 12 and send instructions to the screw rod 54b to extend or retract to raise or lower the crossbar 16 as described above. When the crossbar 16 is moving toward the lowered position or toward the raised position, the controller 20 may identify whether the crossbar 16 contacts an obstruction in the passenger compartment 26. In this example, the controller 20 sends instructions to vehicle 12 components, such as the linear actuator 54, to start or stop an action.

As shown in FIG. 9, with reference to decision blocks 915, 925, 935, the method includes identifying an occupant 22 entering or exiting the vehicle 12. The ingress/egress sensors 70, e.g., a motion sensor, image detection, proximity sensor, etc., may send information to the controller 20 over the vehicle communication network 68.

With reference to block 905, the method includes identifying whether an occupant 22 is seated in one of the seats 14. If an occupant 22 is not identified as being seated in one of the seats 14, the method moves to block 935. If an occupant 22 is identified as being seated in one of the seats 14, the method moves to block 910.

With reference to block 935, if an occupant 22 is detected entering the vehicle 12, the method moves to block 940. If no occupant 22 is detected entering or exiting the vehicle 12, the method returns to its start.

With reference to block 940, if the crossbar 16 is lowered the method moves to block 945 and raises the crossbar 16 to allow for occupant 22 ingress. The controller 20 instructs the motor 54c of the linear actuator 54 to move the crossbar 16 toward the raised position based on an occupant 22 entering the vehicle 12. If the crossbar 16 is not lowered, the method ends.

With reference to block 910, the method identifies whether the crossbar 16 is lowered. If the crossbar 16 is lowered, the method moves to block 925. With reference to block 925, the method identifies whether the occupant 22 is preparing for vehicle egress. If the occupant 22 is preparing for vehicle egress the controller 20 instructs the motor 54c of the linear actuator 54 to move the crossbar 16 toward the raised position based on the occupant 22 preparing to exit the vehicle 12. If the occupant 22 is not preparing to exit the vehicle 12, the method ends.

With reference to block 910, if the method identifies the crossbar 16 is not lowered, the method moves to block 915. With reference to block 915, the method identifies whether the occupant 22 is preparing for vehicle 12 egress. If the occupant 22 is not preparing to exit the vehicle 12, the method moves to block 920. With reference to block 920, the controller 20 instructs the motor 54c of the linear actuator 54 to move the crossbar 16 toward the lowered position based on the occupant 22 not preparing to exit the vehicle 12. If the occupant 22 is preparing to exit the vehicle 12, the method ends.

As shown in FIG. 10, with reference to decision block 1015, the method includes identifying an obstruction between the raised position and the lowered position. After moving the crossbar 16 toward the lowered position, the path that the crossbar 16 follows may become obstructed, e.g., by an occupant 22 entering the vehicle 12, luggage, or other items in the passenger compartment 26, etc. In response to identifying the obstruction, the method moves to block 1020. If no obstruction is identified, the method moves to block 1030.

With reference to block 1020, the method includes stopping movement of the crossbar 16 toward the lowered position based on identification of an obstruction in the vehicle 12. When an obstruction is identified, the controller 20 instructs the motor 54c of the linear actuator 54 to stop movement of the crossbar 16 until the obstruction is removed.

With reference to decision block 1025, the method includes identifying the obstruction identified in decision block 1015 has been removed. If the obstruction is identified as being removed, the method moves to block 1030. If the obstruction is not identified as being removed, the method returns to block 1020 to continue to stop movement of the crossbar 16.

With reference to block 1030, the method includes moving the crossbar 16 to the lowered position based on identification that the obstruction has been removed or based on identification of no obstruction in the vehicle 12. Once the obstruction is removed or no obstruction is present in the vehicle 12, the controller 20 instructs the motor 54c or the linear actuator 54 to move the crossbar 16 toward the lowered position until the lowered position is reached.

With reference to block 1005, the method includes identifying an occupant 22 seated in one of the seats 14 of the vehicle 12. The occupancy sensors 46, e.g., a weight sensor, image detection, buckled seatbelt, etc., may send information to the controller 20 over the vehicle communication network 68. If an occupant 22 is detected in a seat of the vehicle 12, the method moves to block 1075. If no occupant 22 is detected in the seat, the method returns to start.

With reference to block 1075, the method includes identifying which seats 14 are occupied by occupants 22. The controller 20 may receive information from the occupancy sensors 46 that an occupant 22 is seated in a seat of the vehicle 12. The controller 20 identifies the seats 14 that are occupied. With reference to block 1040, later in the method, the controller 20 instructs the inflator 58 to inflate the airbags 18 to the inflated position for the occupied seats 14.

With reference to decision block 1035, the method includes detecting a vehicle impact. The impact sensors 72 of the vehicle 12 may detect the impact. The impact sensor 72 may send information to the controller 20 to indicate the impact.

With reference to block 1040, the method includes moving one or more of the plurality of airbags 18 to the inflated position in response to the detected impact based on occupancy of the seat that corresponds with the airbag. The controller 20 instructs the inflator 58 to inflate the airbag to the inflated position for the occupied seats 14, as identified in block 1075. By way of non-limiting examples, where block 1075 identifies the first seat 14a as occupied, block 1040 instructs inflation of the first airbag 18a; where block 1075 identifies the second seat 14b as occupied, block 1040 instructs inflation of the second airbag 18b; where block 1075 identifies the third seat 14c as occupied, block 1040 instructs inflation of the third airbag 18c; and where block 1075 identifies the fourth seat 14d as occupied, block 1040 instructs inflation of the fourth airbag. Block 1075 may identify any combination of occupied seats 14. Based on the combination identified by block 1075, block 1040 will inflate the corresponding airbags 18. The airbag may control the kinematics of occupants 22 in the seats 14.

With reference to decision block 1045, the method includes identifying an indication that an occupant 22 is exiting the vehicle 12. The controller 20 may receive information from the occupancy sensors 46 that an occupant 22 is seated in a seat of the vehicle 12. Such an indication may include sensing occupancy from a weight sensor, the vehicle 12 being put in park, unbuckling of a seatbelt, image detection in the passenger compartment 26, etc.

With reference to block 1050, the method includes moving the crossbar 16 from the lowered position toward the raised position based on the indication that the occupant 22 is exiting the vehicle 12. As an occupant 22 is preparing to exit the vehicle 12, the controller 20 instructs the motor 54c of the linear actuator 54 to move the crossbar 16 toward the raised position to allow occupants 22 to exit the vehicle 12.

With reference to decision block 1055, the method includes identifying an obstruction between the lowered position and the raised position. The path that the crossbar 16 follows toward the raised position may become obstructed, e.g., by an occupant 22 resting on the crossbar 16 of the vehicle 12, etc. In response to identifying the obstruction, the method moves to block 1060. If no obstruction is identified, the method moves to block 1070.

With reference to block 1060, the method includes stopping movement of the crossbar 16 toward the raised position based on identification of an obstruction in the vehicle 12. When an obstruction is identified, the controller 20 instructs the motor 54c of the linear actuator 54 to stop movement of the crossbar 16 until the obstruction is removed.

With reference to decision block 1065, the method includes to identify the obstruction identified in decision block 1055 has been removed. If the obstruction is identified as being removed, the method moves to block 1070. If the obstruction is not identified as being removed, the method returns to block 1065 to continue to stop movement of the crossbar 16.

With reference to block 1070, the method includes moving the crossbar 16 to the raised position based on identification that the obstruction has been removed or based on identification of no obstruction in the vehicle 12. Once the obstruction is removed or no obstruction is present in the vehicle 12, the crossbar 16 may move toward the raised position until the raised position is reached.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly comprising:
a first seat and a second seat;
a crossbar positioned between the first seat and the second seat;
an airbag supported by the crossbar; and
a controller programmed to position the crossbar in a raised position in response to detected occupant egress.

2. The assembly of claim 1, wherein the controller is programmed to position the crossbar in a lowered position in response to seat occupancy.

3. The assembly of claim 1, wherein the controller is programmed to position the crossbar in the raised position in response to detected occupant ingress.

4. The assembly of claim 3, wherein the controller is programmed to position the crossbar in a lowered position in response to seat occupancy.

5. The assembly of claim 1, further comprising a plurality of airbags including the airbag, the controller being programmed to, in response to a vehicle impact, select inflation of each airbag based on occupancy of the first seat and the second seat.

6. The assembly of claim 1, wherein the airbag is further defined as a first airbag and further comprising a second airbag, the first airbag being dedicated to the first seat, the controller being programmed to, in response to a vehicle impact, select inflation of the first airbag in response to the detection of an occupant in the first seat.

7. The assembly of claim 6, wherein the first seat faces seat-forward toward the crossbar.

8. The assembly of claim 7, wherein the second airbag is dedicated to the second seat, the controller programmed to, in response to a vehicle impact, select inflation of the second airbag in response to detection of an occupant in the second seat.

9. The assembly of claim 8, wherein the first seat and the second seat are spaced from each other along a vehicle-longitudinal axis and the crossbar is between the first seat and the second seat.

10. The assembly of claim 9, wherein the first seat and the second seat face seat-forward toward the crossbar.

11. The assembly of claim 9, wherein the first airbag is inflatable from the crossbar toward the first seat and the second airbag is inflatable from the crossbar toward the second seat.

12. The assembly of claim 9, further comprising a third seat spaced from the first seat along a cross-vehicle axis and the crossbar is between the second seat and the third seat.

13. The assembly of claim 12, further comprising a third airbag, the controller programmed to, in response to a vehicle impact, select inflation of the third airbag in response to detection of an occupant in the third seat.

14. The assembly of claim 12, wherein the first seat and the third seat are spaced from each other along a cross-vehicle axis and the crossbar is spaced from the first seat and the third seat along a vehicle-longitudinal axis.

15. The assembly of claim 1, further comprising a first pillar and a second pillar spaced cross-vehicle from the first pillar, the crossbar moveably supported by the first pillar and the second pillar.

16. The assembly of claim 15, further comprising a first track supported by the first pillar and a second track supported by the second pillar, the crossbar being moveably supported by the first track and the second track.

* * * * *